United States Patent [19]

Lipfert

[11] 4,283,864

[45] Aug. 18, 1981

[54] CUSHIONING MATERIAL CONSTRUCTION

[75] Inventor: Donald E. Lipfert, Woolwich, Me.

[73] Assignee: Deres Development Corporation, Greenwich, Conn.

[21] Appl. No.: 95,788

[22] Filed: Nov. 19, 1979

Related U.S. Application Data

[63] Continuation of Ser. No. 747,681, Nov. 8, 1976, abandoned, and a continuation-in-part of Ser. No. 347,069, Apr. 2, 1973, Pat. No. 4,033,567.

[30] Foreign Application Priority Data

Oct. 4, 1969 [GB] United Kingdom .............. 48860/69

[51] Int. Cl.[3] ........................ A43B 13/18; F16F 3/02; A47C 7/02; A47C 23/00

[52] U.S. Cl. .......................................... 36/28; 5/448; 267/150; 297/452

[58] Field of Search .................. 267/80, 85, 102, 103, 267/142, 150, 151; 297/452, 455, 458; 305/6; 128/70; 5/351; 36/117, 118, 119, 120, 121, 28, 35 R

[56] References Cited

U.S. PATENT DOCUMENTS

| | | | |
|---|---|---|---|
| 3,790,150 | 2/1974 | Lipfert | 267/151 |
| 4,033,567 | 7/1977 | Lipfert | 297/452 |

*Primary Examiner*—Patrick D. Lawson
*Attorney, Agent, or Firm*—Pennie & Edmonds

[57] ABSTRACT

A cushioning material system or construction having at least one module comprising balanced levers and displaceable bearing means, as incorporated in footwear, and such a cushioning material further comprising bearing plates attached to a plurality of said modules which may be made in sheet form for various cushioning purposes.

65 Claims, 26 Drawing Figures

CUSHIONING MATERIAL CONSTRUCTION

CROSS REFERENCE TO RELATED APPLICATION

This is a continuation of application Ser. No. 747,681, filed Nov. 8, 1976, now abandoned and a continuation-in-part of co-pending U.S. patent application of Donald Ernest Lipfert for CUSHIONING MATERIAL CONSTRUCTION, Ser. No. 347,069, filed Apr. 2, 1973, now U.S. Pat. No. 4,033,567.

BACKGROUND OF THE INVENTION

This application is concerned with improvements in mechanical support systems of the type described in U.S. Pat. No. 3,790,150, dated Feb. 5, 1974, the entire disclosure of which is incorporated herein by reference.

The cushioning material construction of the invention, although it may take several forms as described hereinbelow, is basically a construction comprising one or more modules, each having a grouping of displaceable bearing means in a system of inter-connected levers wherein displacement of one displaceable bearing means in one direction will displace another displaceable bearing means in another direction, with one or more of said modules being mounted in a manner to utilize the cushioning effect of the construction for various purposes. The term "displaceable bearing means" as used herein is synonymous with the term "displaceable load support means" as used in U.S. Pat. No. 3,790,150, it being understood that such bearing means may support a load or bear against a load or be a part of a system which supports a load against a surface of surfaces, or to generally bear against anything to distribute forces through the module comprising the lever system and the displaceable bearing means.

For example, it may be used as a shock absorbing means in various constructions such as walls, stationary buildings, elevators, or vehicles, or the like, when things or personnel fall or are otherwise forced against a surface, to prevent or minimize damage or injury.

It is, therefore, an object of the present invention to provide a module with cushioning qualities for various forms of construction which may utilize such a module cushioning construction of the invention and, in particular, components of shoes, boots, footwear, and the like.

Another object of the invention is to provide an improved sheet of such cushioning material which may be formed, or cut into shapes, for incorporation in footwear constructions as soles, or in other ways, and which may be used generally to be adapted to various cushioning purposes.

BRIEF DESCRIPTION OF THE INVENTION

The concept of using a mechanical support system for cushioning has been disclosed in U.S. Pat. No. 3,790,150. The improvements set forth herein include improvements in module constructions including module constructions for incorporation in shoes and boots, and footwear generally. The improvements set forth herein also include the incorporation of modules of the invention in sheet form for use as shoe soles and for other cushioning purposes for shoes and footwear, as well as for general cushioning purposes for constructions other than shoes and footwear. The module system works very well at distributing, supporting and cushioning pressures over irregularly shaped bodies, such as a person's foot. Sheets of modules made in accordance with the invention can be cut to fit as shoe soles or may be made up in rolls of indeterminate length to be cut and applied to various types of constructions for cushioning and shock absorbing purposes.

For example, in constructions such as in vehicles and in other structures where it is desired to incorporate a cushioning or shock absorbing quality into the structure such as walls, stairs, packing materials, as well as many others.

The cushioning supporting and shock absorbing qualities of the mechanical support system of the invention are achieved by providing inter-connected lever type arrangements connected to displaceable bearing means. A grouping of displaceable bearing means is therefore provided which operate with the lever-type arrangements so that displacement of one of said displaceable bearing means in the first direction will apply a force to at least one other of said bearing means in an opposite direction such that the displacement of those displaceable bearing means of said group will conform to the shape of an imposed load and provide for distribution of the weight or force of the load. Groupings of displaceable bearing means are further interconnected by lever-type arrangements in accordance with the invention.

The connection between the levers of the invention is a torsion connection. The torsion connection may be provided in a number of ways. For example, an end of one lever may be centrally connected at the fulcrum area of another area by means of a torsion bushing such as that illustrated in FIG. No. 7 in U.S. Pat. No. 3,790,150. Another way of providing a torsion connection is by making the levers of a springy material so that the connection between an end of one lever to the fulcrum end of another lever may be rotated by twisting the springy material of the first mentioned lever end thereby permitting the connected lever to rotate at its fulcrum area. This torsion means provides a first operative "torsional" mode for the system. The torsional mode allows initial rotation of the levers to readily conform to the shape of the load. A second "flexural" mode is imparted into the system through the stiffness of material in the levers necessary to support the load. The torsional spring constant may be very soft and the flexural spring constant relatively stiff. A tapered lever design greatly increases the spread possible between torsional and flexural spring constants. The tapered shape also reduces the amount of material necessary for any given design by more nearly approaching uniform stress in each lever, also effecting a cost saving.

The term "load" is used to mean the force or weight of a mass or portion of body which is imposed upon the system. This could be the foot of a person upon the sole or other portion of a shoe comprising modules of the invention or it could be any other thing for which the invention is intended to support, cushion or relieve from the shock of impact. For example, in a vehicle a portion of the body of a person which would be thrown against the cushioning system of the invention could be termed a "load" and so-forth.

DETAILED DESCRIPTION OF THE DRAWINGS

The invention is illustrated in the accompanying drawings in which

Figure 12:
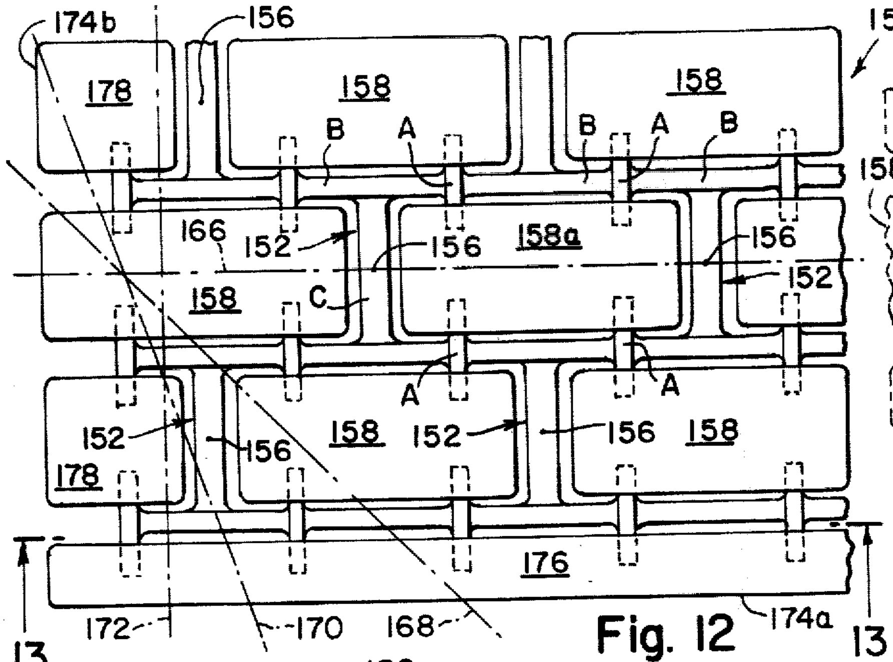
FIG. 12 is a top plan view of a cushioning material of the invention with parts cut away and parts in phantom.
Figure 14:
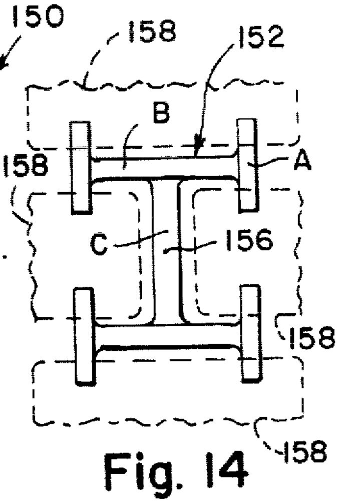
FIG. 14 is a top plan view of a detail of FIG. 12 with parts in phantom and parts cut away.
Figure 16:
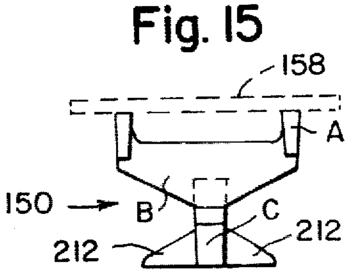
Figure 17:
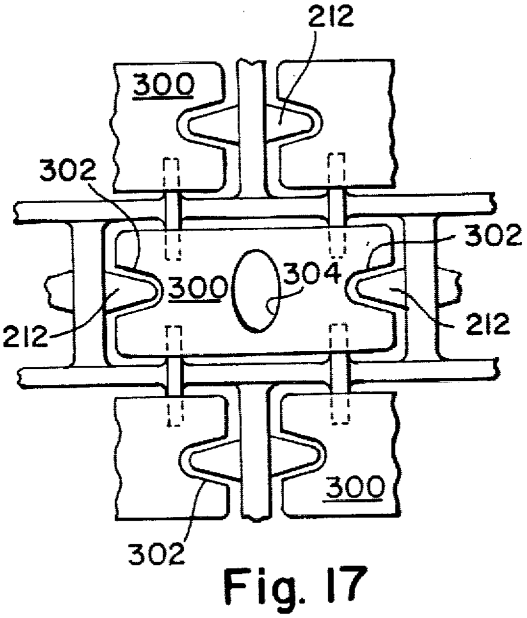
Figure 15A:
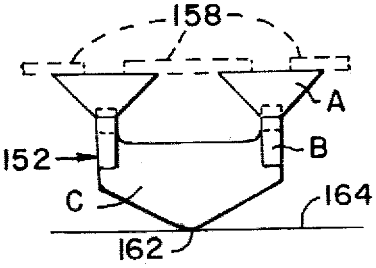
Figure 20:
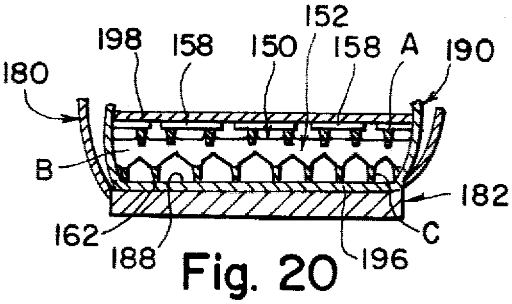
Figure 18:
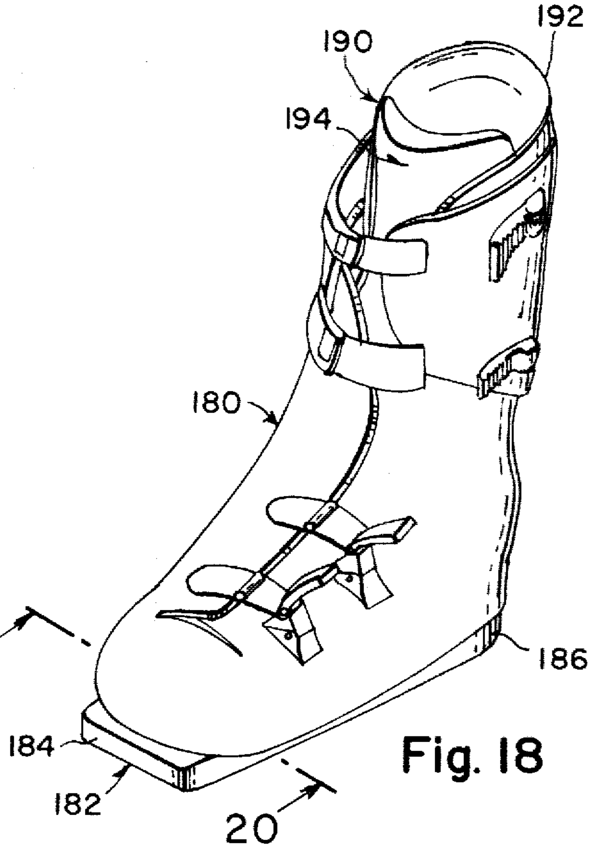
Figure 22:
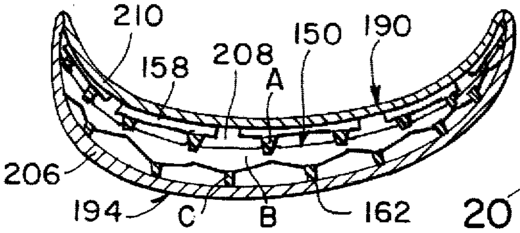
Figure 19:
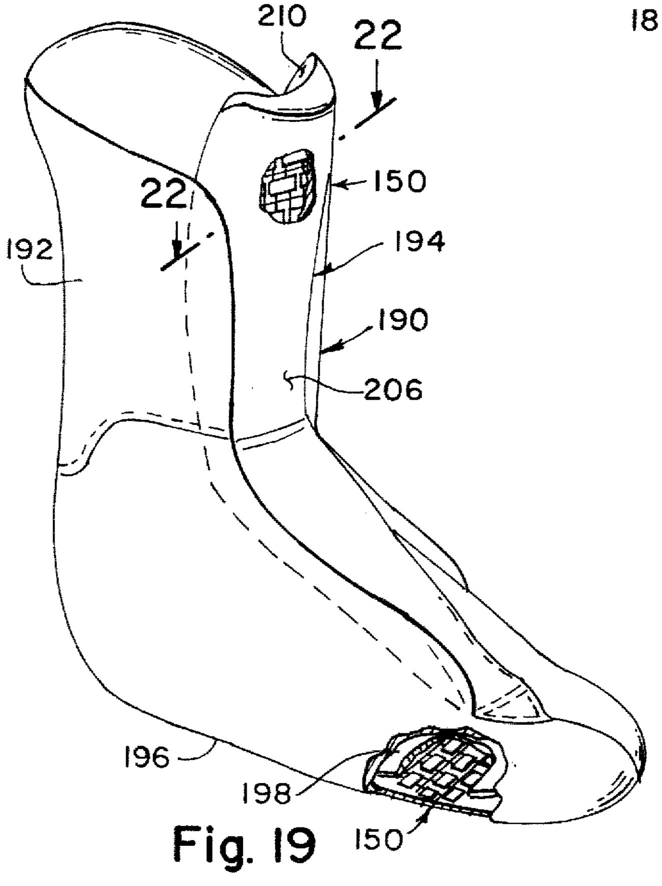
Figure 21:
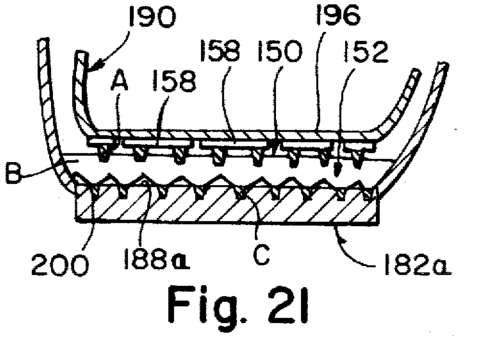
Figure 23:
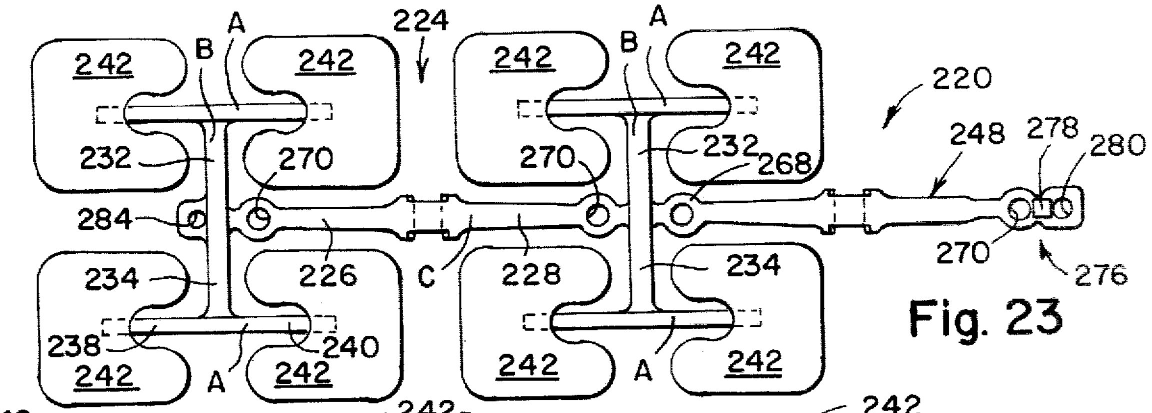
Figure 24:
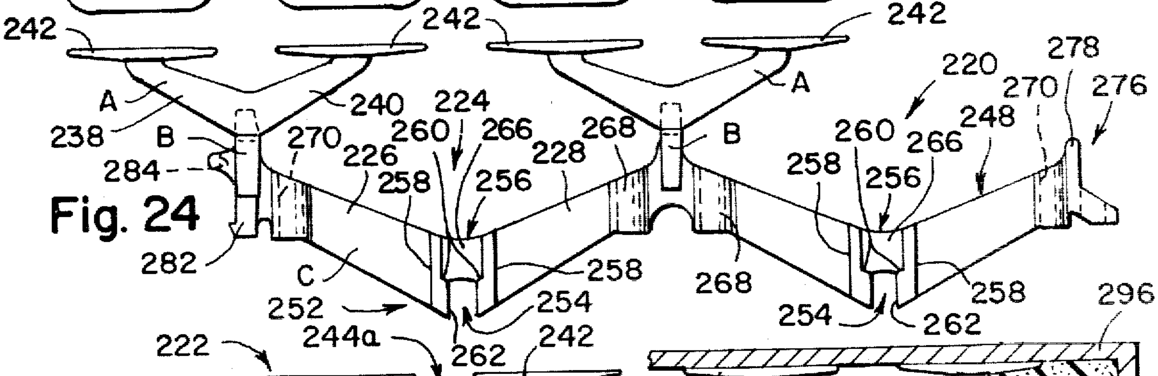
Figure 25:
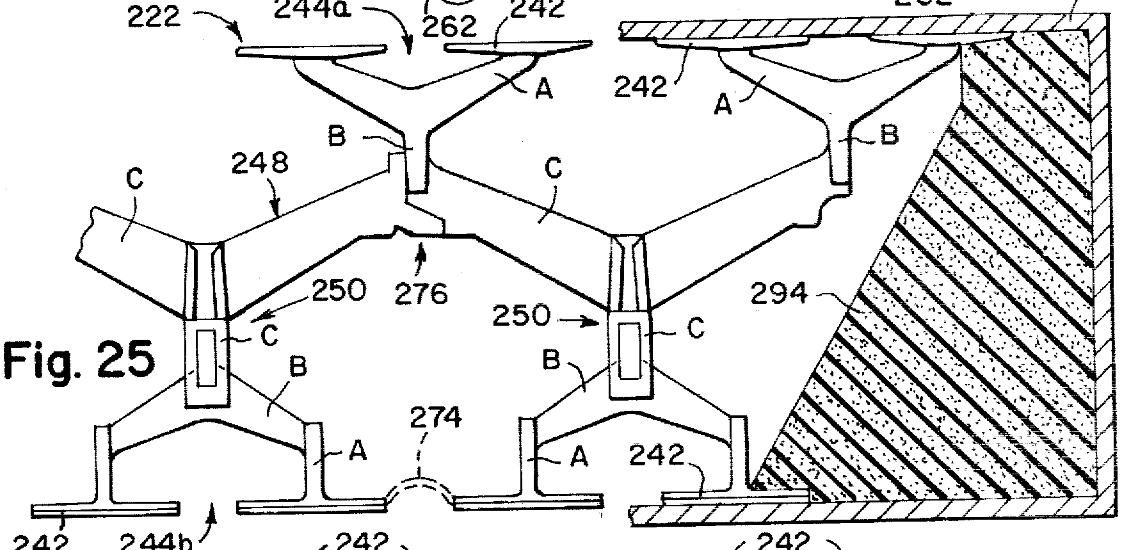

FIG. 15*a* is a side elevation of a module of FIG. 12;

FIG. 16 is an end elevation of a module of FIG. 12 as modified by the inclusion of footings 212;

FIG. 17 is a top plan view similar to FIG. 12 of another form of cushioning material including footings 212 and another form of bearing plates;

FIG. 18 is a perspective view;

FIG. 19 is a perspective view;

FIG. 20 is a sectional view along the lines 20—20 of FIG. 18;

FIG. 21 is a sectional view similar to FIG. 20 showing an alternate form;

FIG. 22 is a sectional view along the lines 22—22 of FIG. 19;

FIG. 23 is a top plan view of another form of module strip of the invention;

FIG. 24 is a side elevation of FIG. 23;

FIG. 25 is a side elevation with parts in section; and

Figure 26:
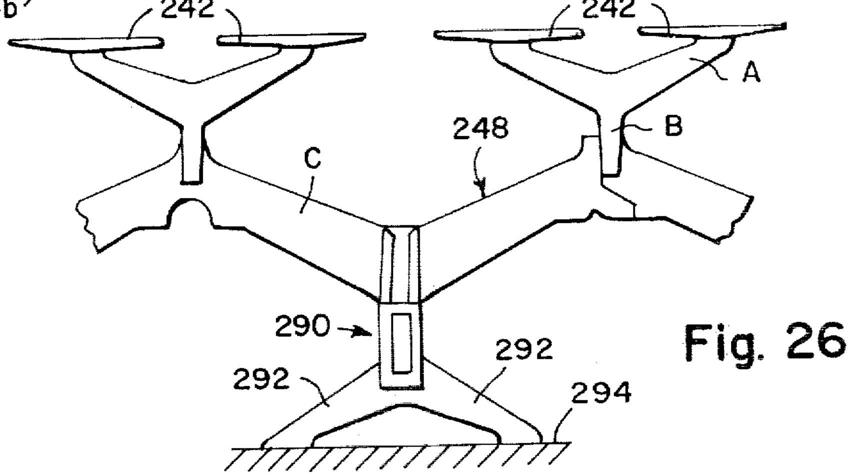

FIG. 26 is a side elevation with parts cut away and parts in section.

DETAILED DESCRIPTION OF THE INVENTION

Figure 5:
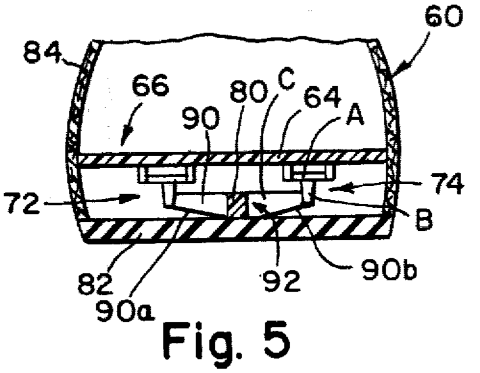
FIG. 5 is a section as seen from lines 55 in FIG. 4.

A basic module of the invention has been illustrated in U.S. Pat. No. 3,790,150 at FIG. 1 (reference numeral 2), FIG. 5 and FIG. 6, and described therein.

Figure 1:
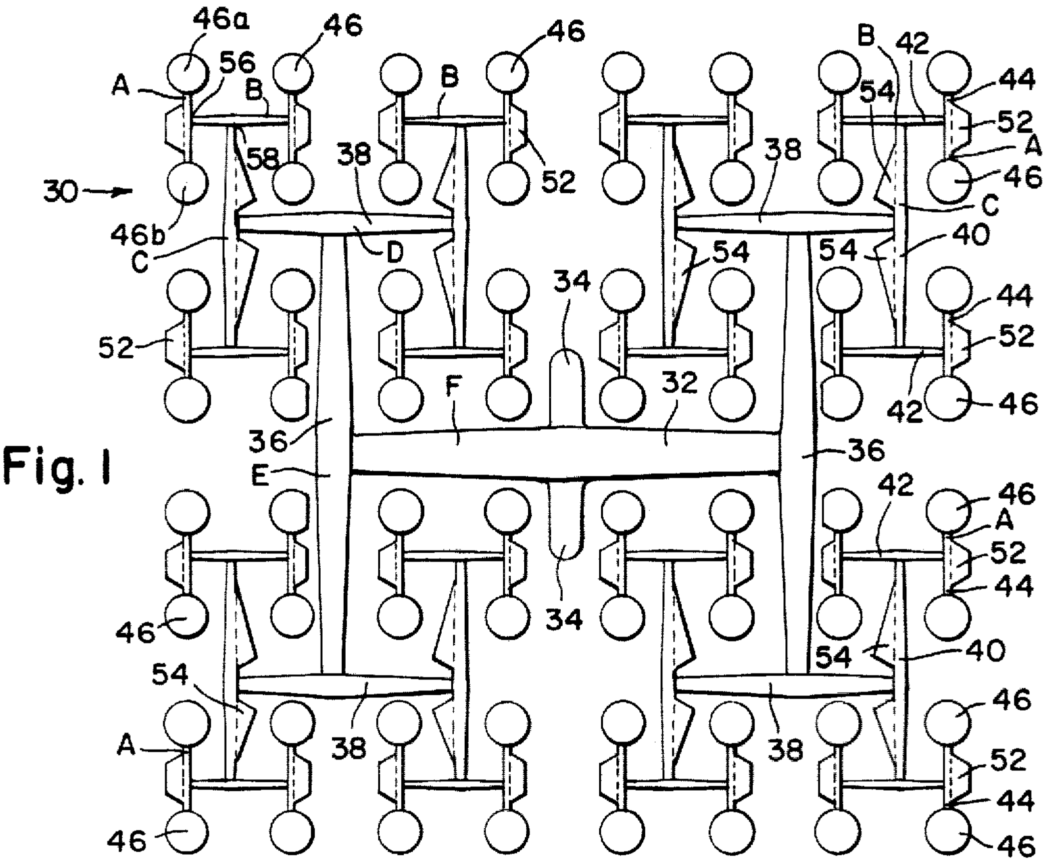
FIG. 1 is a top plan view of a module.
Figure 2:
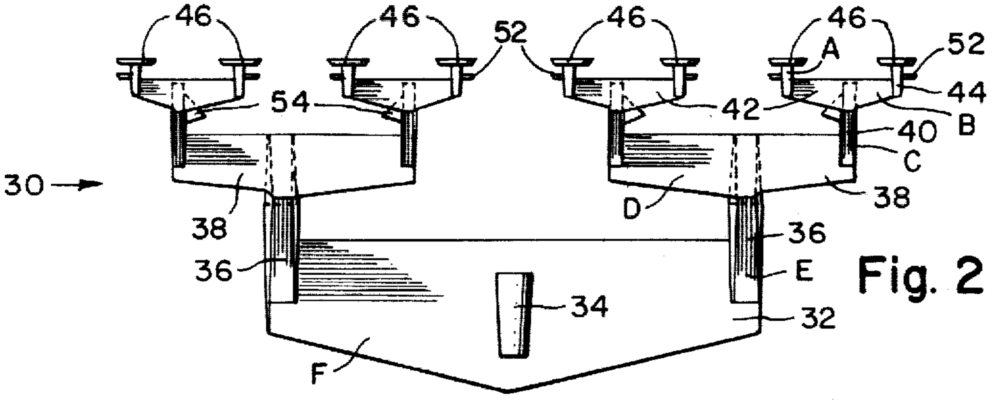
FIG. 2 is a side elevation of the module shown in FIG. 1.
Figure 3:
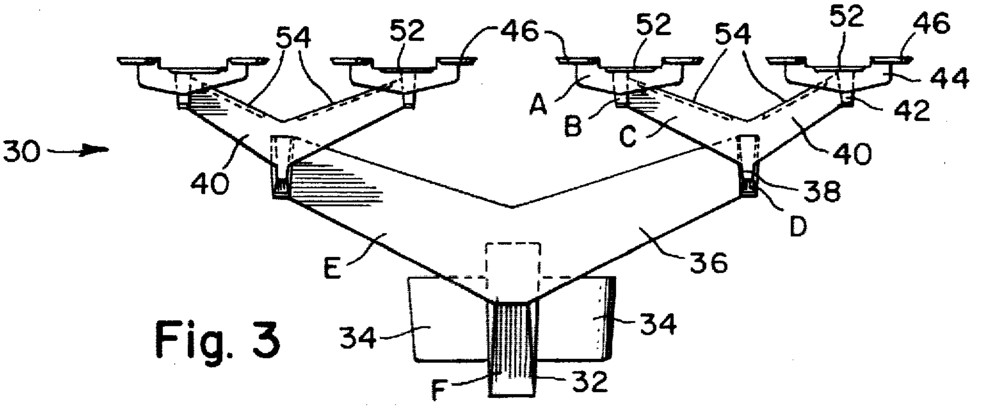
FIG. 3 is an end elevation of the module shown in FIG. 1.

An improved module with some modification is shown herein in FIGS. 1, 2, and 3 as module 30. Module 30 has a lower lever 32 having a pair of laterally extending torsion mounting lugs 34. Lever 32 is connected at each of its ends to central portions of levers 36 which, in turn, are connected at ends to levers 38 which, in turn, are connected at ends to levers 40, thence to levers 42, thence to levers 44 which, in turn, have displaceable bearing means 46 at their ends.

The particular construction of the module is in accordance with that disclosed in U.S. Pat. No. 3,790,150. However, there are some improvements disclosed in FIGS. 1, 2 and 3 herein which enhance the function and construction of the basic module of the invention. For example, the mounting lugs 34 may provide a standardized and positive means for mounting the modules 30 to various types of the construction, as will appear herein. The branched levers 32–44, inclusive, are shown with a taper from center toward end which maximizes the differential between their torsional and flexural stiffness to improve these qualities while minimizing the amount of material needed per module.

In module 30 the uppermost levers 44 are provided with displaceable bearing means 46 which extend above the levers 44. These first mentioned displaceable bearing means may be termed primary displaceable bearing means. They are shown in FIGS. 1–3 of the drawings as circular pads. However, they may be of any particular shape or configuraton desirable for the intended end use.

Secondary bearings 52, as shown in FIGS. 1, 2 and 3 in the form of plates or pads may be placed on the upper portion of levers 44 on a plane somewhat lower than the plane of the first mentioned primary bearing means 46 and tertiary bearings 54 may be similarly placed along upper portions of levers 40. In such a design the stiffness of the module 30 increases as the load increases and the load contacts the secondary 52 and then the tertiary bearings 54. The primary bearing pads 46, as well as the secondary and tertiary bearing pads 52 and 54, are preferably made as large as possible within the construction to provide a maximum bearing area.

The material of the modules of the invention may be urethane or any other shock absorbing type of material having the qualities of springiness. Such materials may be made of natural material such as rubber or synthetics such as the various types of springy plastics, or imitation rubbers, already known, or they even may be made of light springy metals which may be adaptable to the construction of the modules of the invention. Such light springy material may in and of itself provide the torsion means for the torsional mode of the system. Reference is made to FIG. 1 of the drawings. If a load is imposed on displaceable bearing means 46*a* lever A will rotate at its fulcrum area 56 where it is connected to lever B. The springy material which makes up lever B will twist upon rotation of lever A, thus applying the torsion means for the operative torsional module of the system. When displaceable bearing means 46*a* is depressed by a load in a first direction displaceable bearing means 46*b* connected to the other end of lever A will move in an opposite direction during rotation of lever A. In the meantime the load may also be strong enough to cause lever B to rotate where it is connected (at reference numeral 58) to an end of lever C. This will result in one end of lever B moving in a first direction and the other end of lever B moving in an opposite direction during such rotation and, again, the torsion means would be in the springy material comprising the end of lever C which is connected to the fulcrum area of lever B at reference numeral 58. The various levers A in FIG. 1 of the drawings are a first lever type arrangement, the levers B are a second lever type arrangement, the levers C are a third lever type arrangement, all of which are inter-connected in the manner described to the displaceable bearing means 46. The same type of torsional mode would be found in the further types of lever arrangements D, E and F in the lever end of fulcrum area connections between these further lever arrangements. While a fairly large module has been illustrated in FIGS. 1, 2 and 3 of the drawing the same principle can be incorporated in modules having much fewer lever type arrangements. For example, a module satisfactory for incorporation in a shoe construction could be made with only two or more lever type arrangements.

Footwear, such as a shoe or boot, 60, may have cushioning components made in accordance with the invention.

A module system 62 together with a flexible sheet 64 constitute a portion of the shoe, 60, such as the inner sole 66. System 62 would be made up of a number of modules 68–78 joined by at least one central runner 80 that would serve to permit the modules 68–78 to be molded as a unitary system 62. The unit 62, as shown in FIG. 4, would be bonded to the flexible sheet 64 that could be prepared and shaped or molded with thickness variations to provide uniform load distribution between supporting levers of the modules.

The lower portion of the module unit 62 may be affixed to an outer sole 82 which, in turn, can be sewn or fastened to shoe upper 84 in any manner known to the art. The lower portion of the unit 62 including the runner 80 and cross runners 86 and 88 may themselves be used as an outer sole eliminating an additional outer sole 82. In this case it might be desirable to thicken the bottom portions with extra material and also by providing extra corners between the cross runners 86 and 88 or in other areas, or by using steel or other hard material for the runner 80 and cross runners 86 and 88.

Figure 4:
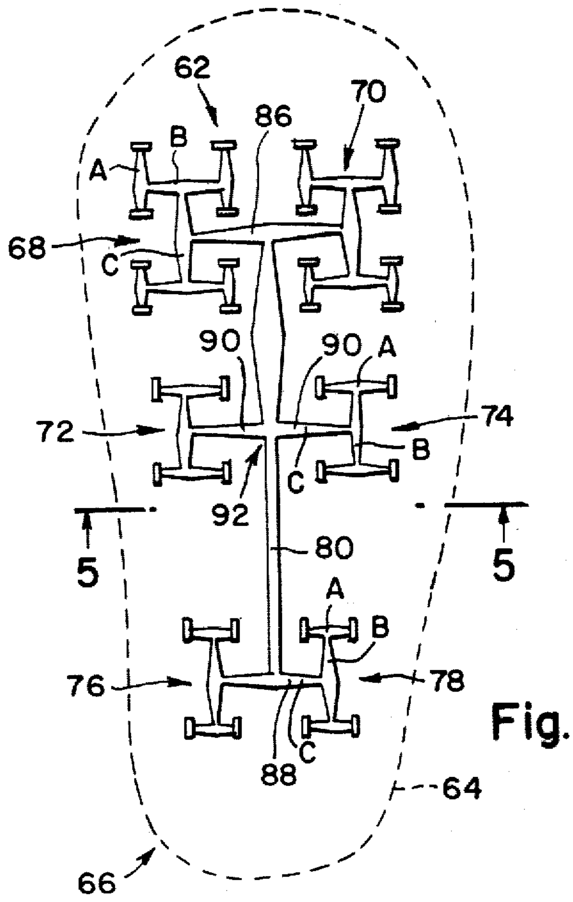
FIG. 4 is a top plan view of footwear with parts in phantom.

The dotted outline 64 in FIG. 4 represents a piece of leather, plastic or other material suitable for use as an inner sole of a shoe which would serve as support for the sole of the foot of the wearer. The inner sole portion 64 may be placed over and cemented to the modules of unit 62 in the position shown in FIGS. 4 and 5.

Modules 68 and 70 are similar in operation to module 30. They are placed on cross runner 86 to the left and right of a center line formed by runner 80.

Further back and at an area designed to be beneath the arch of the wearer a second pair of modules 72 and 74 are mounted on a movable cross lever 90 which, in turn, is mounted at reference numeral 92 to runner 90. The mounting of lever 90 may have a rocking area at 92 so that modules 72 and 74 may have a relative and opposite up and down motion respective of each other. In the form shown in FIG. 5 the rocking at area 92 is made by slanting the undersides **90*a* and 90*b* of runner lever 90 upwardly, as shown. Finally, there are a pair of modules 76 and 78 fixed side by side at the heel portion of the sole 66 to operate independently of each other in the same way as 68 and 70** at the toe portion operate.

The modules 68 and 70 have levers inter-connected at first arrangement A, second arrangement B, and third arrangement C, on successive levels. Modules 72, 74, 76 and 78, have first lever A arrangements and second lever B arrangements.

Figure 6:
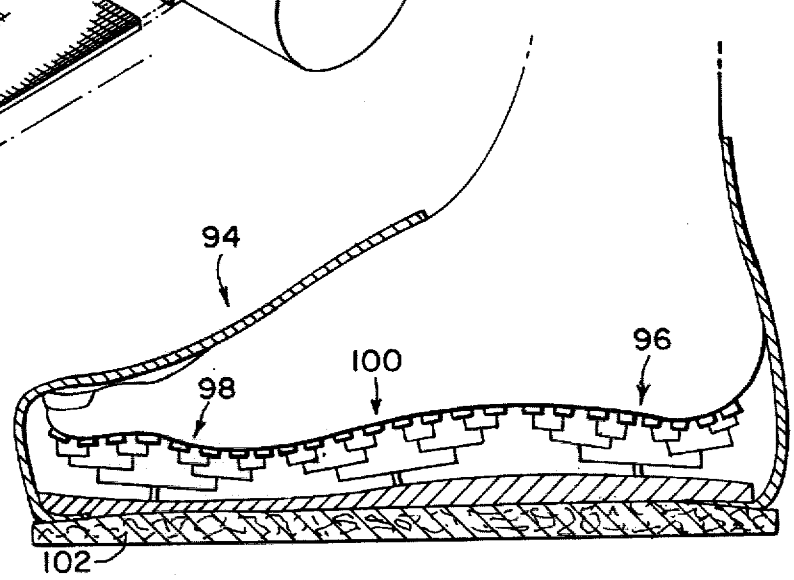
FIG. 6 is a medial cross-section and side elevation of another form of footwear.

The requirements in a footwear construction may be different for different areas of the foot. Another form of footwear such as in shoe construction 94 is shown in FIG. 6.

Stiffnes of the module elements might vary to provide support where most needed. The modules 96 under the heel could be stiffest because of the small area and the impact loads experienced in walking or running. The ball of the foot might require modules 98 having a medium level of stiffness and modules 100 located at the arch might need relatively light support. In this manner each portion of the foot could perform best its intended function.

The lower sole 102 coule be made of leather or a stiff material such as wood or even a metal having suitable portions known to the footwear art to aid the wearer in stepping from heel to toe in the usual walking exercise.

The unit 62 described above is basically a cushioned pad for footwear. Such cushioned pads 62 may be finished off and employed for many needs less specialized. The module suspension structure may take the form of a rectangular pad or strip which may be laid in place or wrapped around something to be protected. Such a pad could have miniatureized modules linked together.

A material incorporating the invention may be made in pads of desired sizes or sheet material of indeterminate length. The pad or sheet structure of the invention including a module system can be made to conform readily to its load yet strongly resist further deformation.

This might render it a suitable pad or sheet material for absorbing shock in dynamic situations involving vehicles or the use of sporting gear such as helmets and knee pads. Module pads might also be used for packaging delicate items or protecting injured or burned limbs while permitting air to circulate, supporting patients on a stretcher or operating table, or supporting people on seats that would be ventilated. Pads may be molded in sheets and joined for larger coverage or cut to shape for smaller or contoured areas (including soles and other portions of footwear.) They may be from ⅛" to several inches thick and would consist of many modules with from two to perhaps six levels of lever arrangements molded together via runners, or otherwise, to form sheets or fabrics.

Figure 7:
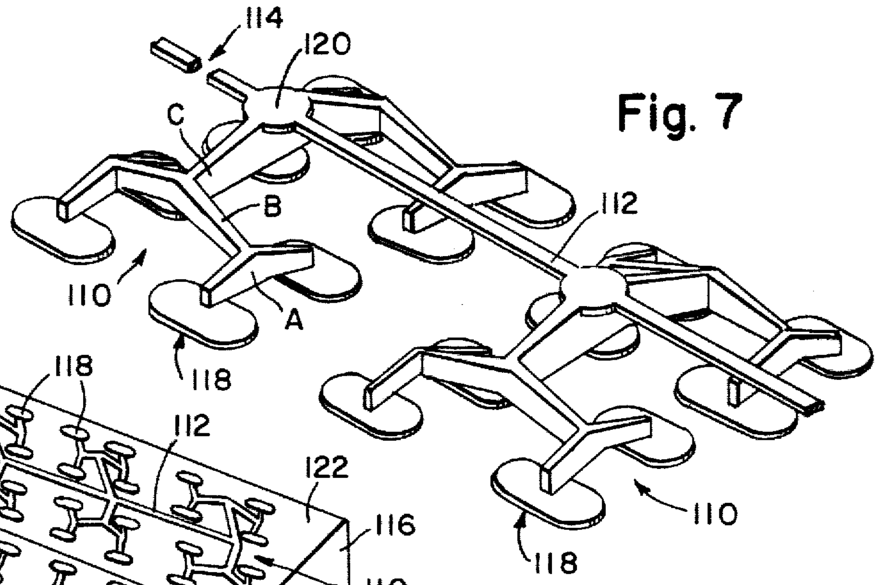
FIG. 7 is a perspective view of a strip.
Figure 8:
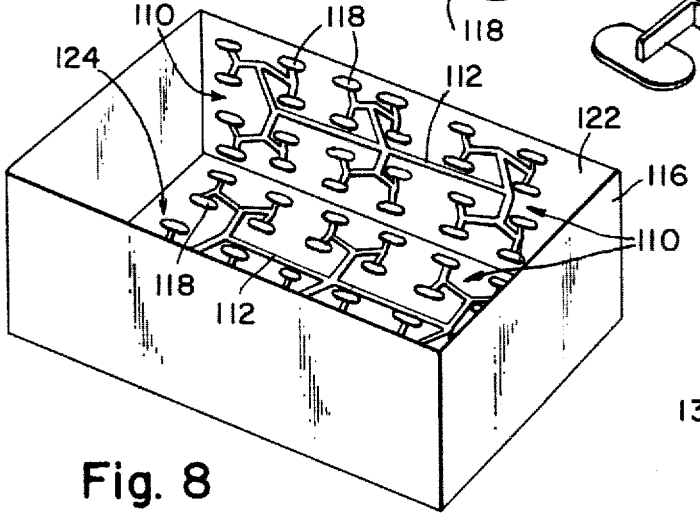
FIG. 8 is a perspective view.

Packaging and general cushioning materials are shown in FIGS. 7 and 8 of the drawings. In FIG. 7 modules 110 are mounted along a continuous strip 112. The strip 112 could be cut at any desired point such as point 114 to provide a strip 112 having any desired number of modules 110. In FIG. 8 the strip 112 has been cut into lengths having three modules 110 to fit within the dimensions of a box 116. Either the strip 112 (or the bearing surfaces 118) can be provided with a coating of pressure sensitive adhesive as at area 120 so that the strip 112 can be placed against a package wall 122 and held for packing purposes (or, if desired, the bearings 118 can be secured to the package wall 122). In any case, the packaged load or item to be placed within indicated at reference arrow 124 will be held inside the cushioning formed by strips of modules 110. The load or item 124, which is indicated by the arrow, may be anything which is subject to being packaged in a box or wrapped.

Figure 9:
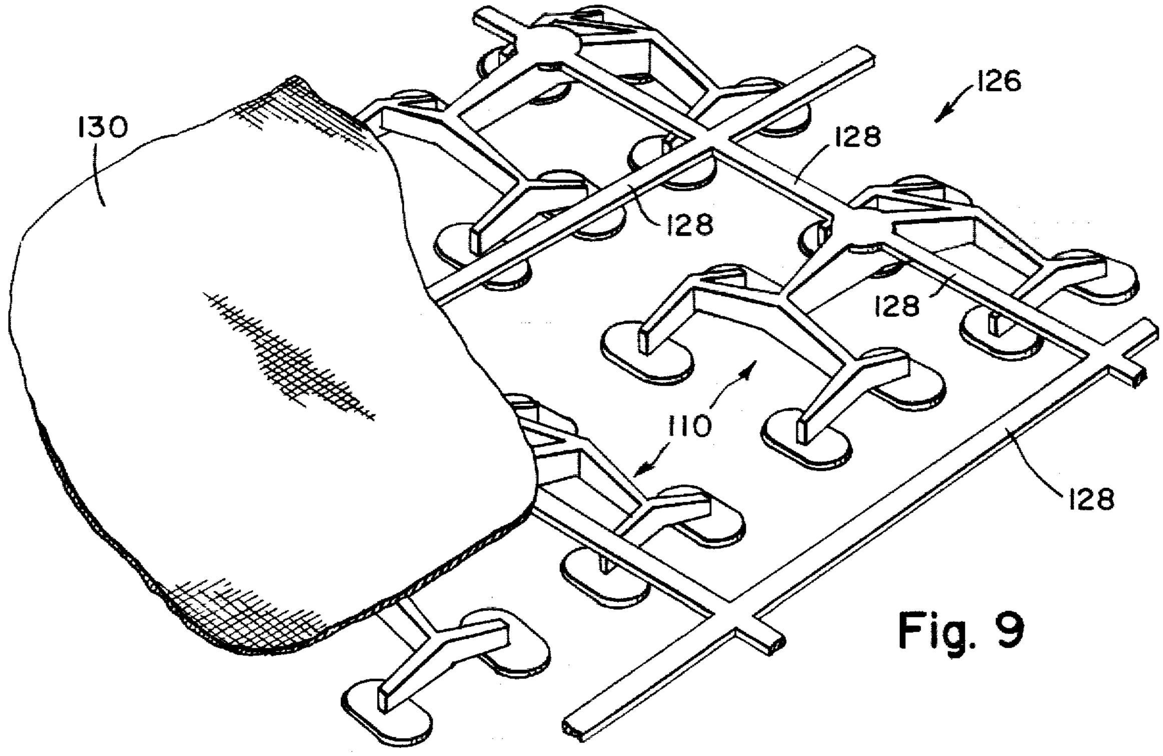
FIG. 9 is a perspective view.

In addition to providing continuous strips 112 formed with a single row of modules 110, a broader cushioning material 126 can be made up having grids 128 with modules 110 placed at regular or desired intervals (as in FIG. 9). Thus a cushioning material 126 having determinable length as well as determinable width can be made in large pieces which can be rolled and stored for future use. Such a roll could be unrolled much the same as fabric piece goods or rolls of wrapping paper and cut to a desired size for fixing into a package 116 or for wrapping around an item 124, or 592, directly without a box 576, or for any other cushioning or shock absorbing purpose.

Another use for the strip 112 or the grid material 126 can be for safety cushioning purposes in a vehicle such as an automobile. Strips 112 or grid material 126 made of modules 110 can be cemented or otherwise adhered to door posts, dashboards, roofs, as well as floors or any other portions of the interior of a vehicle such as an automobile, or elevator, or any other moving or stationary construction as a safety feature.

Figure 10:
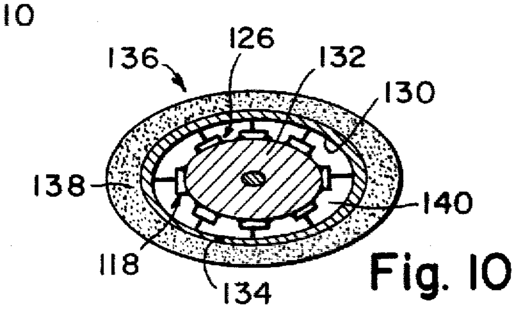
FIG. 10 is a sectional view.

Cushioning material 126 may be provided with a backing 130 made of sheet material or from other suitable material, film or fabric, as shown in FIGS. 9 and 10, to adapt it to use in plaster cast applications which may be used to set broken bones, as well as for other purposes. The limb or body area over which it is desired to place a cast is measured. A quantity of material 126 with its backing 130 is cut to size and then placed around the limb or body portion 132 with the bearings 118 against the limb 132. If preferred, the fabric material 130 could be placed beneath the bearings 118 or two layers may be used above and below the grid material 126.

The entire construction is brought together at a point such as point 134 and the cast 136 finished by any means known to the art. For example, a layer of the usual plaster 138 used in making plaster casts can then be formed over the construction. Or, instead of plaster 138, a winding of adhesive tape or any other material which would form a rigid structure around the material 126 can be used. The advantage of this construction is that the spaces indicated at reference numeral 140 will permit air to come between the cast 118 and the limb 132 and may also permit the patient to be washed underneath the cast 118 in some applications. It is to be understood that the fabric 130 may be a porous fabric and the material out of which cushioning material 126 is made for this application could also be a material porous enough to permit air to seep through if desired.

Figure 11:
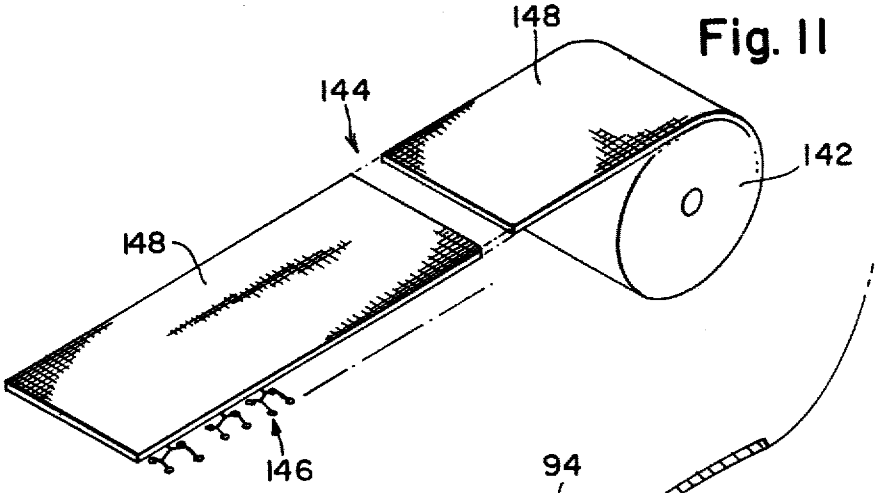
FIG. 11 is a perspective view.

In FIG. 11 a long roll 142 of cushioning material 144 with modules 146, made in accordance with the invention, is shown. In such a roll 142 the modules 146 (FIG. 11) could be similar to modules 110 (FIG. 7) having interconnected groupings or arrangements of A, B and C levers of springy material. The modules 146 could be molded or connected directly to the sheet material 148 which serves as a base support to hold the modules in position in the completed cushioning material 144.

In FIGS. 12 through 16 of the drawings another form of cushioning material 150 is shown. This form of cushioning material includes levers A, B & C as arranged in modules 152. Material 150 is fashioned to be relatively thin (about ⅛") and also to comprise its own main support means to hold it together to be complete and ready for use as a cushioning material. Such a material 150 has many general uses for cushioning and shock absorbing. It is readily adaptable for use in footwear constructions such as shoes, boots or the like. It may be cut or die-cut into various shapes, for example, shoe sole shapes as well as many others. It may be made in large sheets or rolls of indeterminate length or in pads of desired sizes.

Figure 13:
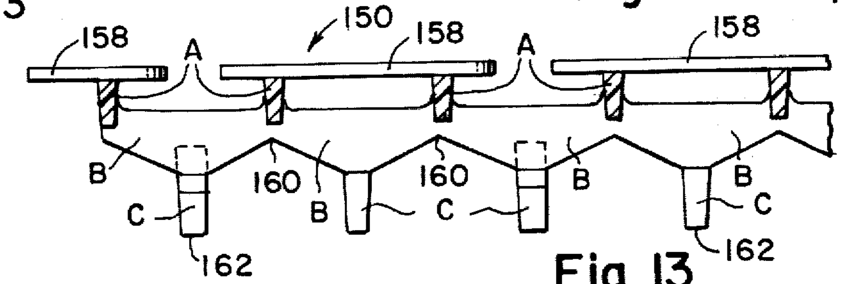
FIG. 13 is a sectional view along the lines 13—13 of FIG. 12.
Figure 15:
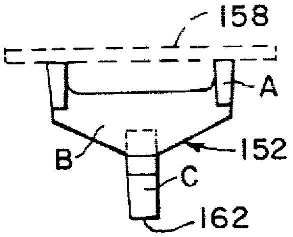
FIG. 15 is an end elevation of a module of FIG. 12.

The material 150 is preferably made of springy plastic into sheet form of the kind shown in FIGS. 12 and 13 of the drawings. The modules 152 are arranged in staggered relationship. Levers B of modules 152 are commonly connected to levers A to form rows of B levers in substantially parallel alignment. Levers C are connected to the B levers to complete the modules 152 positioned in said staggered relationship in material 150. Each module 152 if separated from material 150 would have its center at a midportion of a C lever. This is indicated at reference numeral 156 in FIGS. 12 and 14.

The material 150 is also held together by the displaceable bearing plates 158 which are connected to the outer ends of levers A of molecules 152. Inspection of FIGS. 12 and 13 will reveal that levers A are connected to levers B where the ends of each lever B are joined together, as at reference numeral 160. Therefore, if we were to remove the displaceable bearing plates 158 from the material 150 we would see rows of levers B being joined commonly at their ends to a common lever A between them which would work with each of said adjoining levers B of adjoining modules 152 thereby forming rows of modules 152 in parallel alignment and in staggered relationship.

Thus, while levers B form rows, the levers B in such rows are positioned in alternately staggered modules 152 positioned on either side of a given line of included levers B. As a result the displaceable bearing plates 158 which are connected to levers A are normally directly connected through levers A to four of the modules 152 arranged in material 150. This is shown in FIG. 12 of the drawings where displaceable bearing plate **158*a* is shown. Bearing plate 158*a* is connected to four levers A, which in turn are connected to levers B of four different modules 152**.

Thus a load on any part of the displaceable bearing plate **158*a* (or any bearing plate 158 of the invention) will affect the four modules to which it is connected and so on through the connections of Lever A and through the connected levers of the other modules 152 to other displaceable bearing plates 158 to spread the forces of the load to other inter-connected modules 152** of the system.

A module 152 of the cushioning material 150 comprises the levers A, B and C and a portion of the displaceable bearing plate 158. The lowermost portion of each lever C has a rocking point 162. If a cushioning material 150 were placed on a surface indicated in FIG. **15*a* by the line 164 it would be possible when a load is placed on any of the bearing plates 158 for the lever C to rock over surface 164. A cushioning material 150 made up of a plurality of modules each having a rocking point 162** would have the further cushioning effect provided by the ability of each lever C to rock in the manner described.

Sheets of cushioning material 150 may be die-cut into almost any shape.

The inter-connected levers A, B & C maintain a balanced lever system in the modules 152 of cushioning material 150. The balance of the levers could be disturbed if a cut is made through a lever A. However, cuts made along any of the dotted lines 166, 168, 170 or 172 in FIG. 12 would not necessarily disturb the balance of the system as they would not cut through a lever A. In an extremely thin material such as that for use in shoe or boot constructions the modules are so small (⅛" material) that die-cutting of levers A at edges of the shape, where the load is diminished, would leave an unbalance of little significance.

Thus, for all practical purposes a thin cushioning material 150 can be die-cut in the shape of a sole (or in other shapes) without impairing the balance of the system.

If desired, the sheets or rolls of cushioning material 150 can be finished off by making edges **174*a* & 174*b* as illustrated in FIG. 12. One edge 174*a* might contain a long strip-type bearing plate 76 and another edge 174*b* might be finished with an alternate line of normal size bearing plates 158 and shortened bearing plates 178. It is to be understood that the representation of FIG. 12 is a corner of a much larger pad or sheet of material 150. The bearing plates 158 as shown in FIG. 12 should be longer than a balanced lever B so that normally each plate, except for the end plates 178**, would be long enough to be attached to the levers A.

It is preferred to use a cushioning material such as material 150 in footwear such as a heavy shoe or ski boot.

Current ski boots 180 (as depicted in FIG. 18) are molded of a urethane too stiff and cold for placing the foot directly in contact with it. While its stiffness provides good ski control, it must be lined with resilient material that will conform to the foot, filling space between the foot and boot. This is usually some form of foam filling a bladder to provide maximum support. Some portion of this operation is performed at the time of purpose to fit each customer.

Use of cushioning material of the invention provides a means for lining ski boots that will adapt to the peculiarities of individual feet and still provide the firmness desired for good ski control. It will also provide resilience particularly under the heel to reduce shock loads, and will impede the flow of heat and still provide adequate ventilation to carry off perspiration.

Boot 180 is an outer boot made in any manner known to the art and is provided with a fairly solid and rigid sole 182 having a toe portion 184 and a heel portion 186 which outwardly are made in any fashion to fit and cooperate with skis and ski bindings.

The sole 182 on the inside of the boot 180 has a fairly flat and solid upper surface 188 over which an inner boot 190 fits. The inner boot 190 is in sock form having uppers 192 and a tongue 194 and a sole portion 196. The bottom of the inner boot 190 sole portion 196 fits over the top of the sole 188 of the outer boot 180 when the inner boot 190 is contained in the outer boot 180.

The cushioning material (such as material 150) may be incorporated into the upper part of the sole 196 of the inner boot 190 by cementing it in place over the upper part of the sole 196 so that the foot of the wearer will bear in a general outline over the displaceable bearing plates 158. If desirable, a flexible cover, preferably of leather, or other suitable material 198 may be glued or affixed in any other fashion over the bearing plates 158 of the system. Since the sole portion 196 of inner boot 190 may be of a soft or pliable material when the inner boot is fitted into the outer boot, as shown in FIG. 20, the bearing plate system will operate under load conditions on the hard upper surface 188 of the outer boot sole 182 without hindrance from the soft material of the soft sole 196 of the inner liner 190.

Another type of construction incorporating the bearing pad system of the invention as a sole portion of footwear such as a ski boot or ski boot combination includes the provision of generally parallel grooves 200 running between toe and heel along upper surface **188*a* of sole 182*a* into which the levers C of cushioning material 150** have been placed.

Cushioning material may be die-cut out of a sheet of material 150 to fit over boot sole **182*a*. The grooves 200 may be molded on the boot soles inner surface 188*a*, or fashioned in any manner known to the art. The modules 152 forming the sheet 150** may be of varying heights so that more displacement is provided under the heel where dynamic pressures are highest.

The pliable sole 196 of a soft inner boot liner 190 may be placed directly over the bearing plates 158.

It is to be understood that a complete boot may be manufactured without an inner liner, such single boot comprising a sole such as sole 182 or **182*a* and the cushioning material such as material 150. The wearer places his foot directly over the bearing plates 158 without using an inner boot 190**.

The cushioning system may be utilized to form the entire inner boot, if desired, it has the ability to readily conform and has the potential of fitting a range of foot shapes and sized without the need for adjustments or fillers. Two or more die cut shapes may be joined to cradle the foot. Because the sheets are of injection molded thermoplastic material they may be post formed into contours approximating the foot shape. Some areas as the rear of the ankle require deeper modules to accommodate the foot to the footwear.

The displaceable bearing pads 158 would be facing inwardly toward the foot. Because the pads 158 are discontinuous, it may be desirable to cover the inner surface with a continuous coating. This might be a flexible leather or other flexible breathable material. The module levers C lie directly against the boot inner surface. The inner cover may be sewn or bonded to the modules 152. They may also be joined by heat sealing the pads 158 together or by bonding the pads 158 by heat to the inner cover.

The bearing pad system of the invention can also be incorporated into other portions of the boot, for example in the upper portion of the inner boot 190, as shown in FIGS. 19 and 22. In the usual soft inner liner 190 of a ski boot there is a good deal of padding on the inside of the uppers as well as in the tongue. No explanation need be given of this as various types of padding are standard and well known in the art.

Referring now to FIG. 22 of the drawings, we see a cross section of the tongue 194 of the soft inner liner 190 of FIG. 19. The outside material 206 of the liner 190 and the tongue 194 is made of a firm outer skin such as a vinyl plastic or any other suitable material from which ski boots may be made. The liner 190 usually has a quantity of padding in the area 208 between outer skin 206 and the inner skin 210. The padding in area 208 may be plastic foam, cotton, air space or any other type of padding presently known to the art. Within the padding area 208, the bearing plate system (such as material 150) of the invention is interposed in place of, or in addition to, the padding of the prior art with the bearing plates 158 facing inner skin 210 which in turn faces the leg of the wearer. The bearing plates 158 may be just inside the skin 210 and may be glued or fastened to inner skin 210 in any fashion known to the art.

The bottom points 162 of the base levers C of the bearing pad system will bear against the tough outer skin 206. Similar installations of bearing pad systems may be made in any portion of the soft inner liner 190 (or in any portion of the outer boot 180) where deemed desirable by the manufacturer.

When using the bearing pad system in footwear such as a dress shoe which may be made of a much softer material than the hard ski boot, it may be desirable to add a footing, or footings 212, to the lower most lever C of the cushioning pad system 150. This is illustrated by the footings 212 in FIG. 16 of the drawings. Cushioning material 150 as originally described herein above does not include footings 212. Cushioning material 150 including footings 212 may be used in a footwear construction by placing such material as an inner sole directly over the outer sole of the footwear. The outer sole usually of leather, or some synthetic, is pliable so that the wearer may walk with ease. The inner sole is made up of the cushioning material 150 which includes the extra footings 212 which bear down on the sole of the shoe. Without the footings 212 the hard points 162 formed by the lowermost levers C might eventually wear through the sole. To finish off the bearing pad inner sole system 150, including footings 212, an upper layer of leather similar to cover 198 may be supplied if desired.

The construction just described may be glued into the shoe or it may be made in sheets which may be cut to size or it may be prefinished in various sized for slipping into or insertion into shoes which are already completely fabricated as an extra inner sole, or to be slipped into a basic shoe construction as the inner sole without cementing the construction to the shoe sole itself.

The footings 212 may be molded to the modules in the same fashion and of the same material as if they were levers A, B or C.

The cushioning material 150 is a two mode elastomeric spring system. It has the ability to distribute loads evenly in the torsional mode and can provide a good fit without excessive pressure at any one point. The secondary load carrying phase is in the flexure of the levers and can be designed to be as firm as desired for good control. They may be designed for a stress level at expected loads so that significant permanent set can be avoided. Levers may be designed to accept a specific load in flexure but yield at much lower loads in torsion. The stiffness of the molded material may also be varied to suit subjective reactions.

Module size is largely determined by the depth available. Larger modules obviously require longer and heavier levers and consequently greater depth. Because of the need to die cut shapes from a molded sheet 150 and because of the limited height, it is desirable in this case (shoes and ski boots) to use a small module size.

The material of the invention will provide good insulation. Because of its open construction it is possible to realize ventilation around the foot to carry off moisture. A dry enclosure around the foot will provide better insulation than one saturated with moisture. The stepped lever construction also provides a long narrow path to reduce heat flow by conduction.

Sole pads made in accordance with the invention may be prefabricated in any particular size or shape and could be used in conjunction with any type of footwear and positioned immediately below the foot of the wearer within or upon such footwear. In addition, material comprising the bearing pad system may be made in piece goods fashion by the yard and cut to size for any particular use in connection with footwear and cemented to the outside or inside of any footwear construction in accordance with the teachings of this invention.

Another form of module strip 220 and cushioning material 222 made therefrom is shown in FIGS. 23-25 of the drawings. Module strip 220 comprises a number of modules 224. Each module 224 comprises a base lever C having branches 226 and 228, a pair of intermediate levers B having branches 232 and 234 disposed perpendicularly and four upper levers A, each having branches 238 and 240. The branches 238 and 240 of the upper lever support a displaceable bearing means 242.

A series of modules 224 in alignment provide a plane-like surface comprising groupings of bearing means 242.

In this form of the invention the modules are arranged in strips for connection to other strips of modules to provide double faced surfaces of strips or relatively thick sheets requiring no base support sections, which may be utilized as mattresses, or for other cushioning or shock absorbing purposes.

This is accomplished by providing for a back to back arrangement of modules 224 which can be attached to each other or molded integrally to form a material 222 with two surfaces 244*a* and 244*b*, each of which has displaceable bearing means 242. Either surface 244*a* or 244*b* can serve as the base support for the material 222, which is self-supporting.

The modules 224 are arranged in longitudinal strips 248 for connection transversely to other modules 224 in longitudinal strips 248 at the bottom of levers C.

When making the connection at the centers of the levers C, a coupling 250 is formed between the coupling portions 252 of levers C. The coupling 250 comprises a notch 254 at the bottom of lever C of module 224 above which is a solid coupling section 256. Both notch 254 and solid portion 256 are bordered by stepped shoulders 256 with steps 260.

Modules 224 may be coupled together back to back in the following manner. Two levers C of modules 224 are held in a bottom to bottom relationship at a 90 degree twist. The coupling portions 252 are pressed together. The springy material of the levers C permit the shoulders 258 alongside notched portions 254 and inner wall portions 262 of each module 244 to stretch apart and pass by the corresponding portion of the other module 224. Inner wall portions 264 and shoulders 258 of each module 224 will then snap into place over wall portions 266 and steps 260 of the other coupled module 224. Thus, when a coupling 250 is completed, the notched portions 254 snap around the solid portions 256 and will be held in place by the steps 260 and shoulders 258 to keep the modules 244 together. The springiness of the material of the levers which provides the flexibility necessary for the fit to be made. The fit may require some pressing and squeezing to be made.

This construction provides for a reenforced joint. For example, when levers C are flexed in one direction by a load the notched portions 254 will squeeze against the solid portions 256 to withstand the force of the load on the levers. If the flexing of the levers is in the other direction, the solid portion 256 of the lever C will withstand the force of that flexing. The coupling or joining made in this manner provides a firm construction for the levers to function in accordance with the invention.

Each lever C of module 224 has a tubular formation 268 on either side of the coupling portion 252. The tubular formation 268 is provided with a central space 270. The central space 270 permits the inner walls or wall of tubular formation 268 to be flexed. This provides for longitudinal compression of branch arms 228 and 226 of lever C and also provides a "hinging action" between the lever C and the lever B of module 224.

In the form of invention in which the modules 224 are provided in a strip form, the strips 248 may be of indeterminate length or sized to make cushioning materials of predetermined sizes. The strips 248 for convenience may be made with a standard number of modules. In the illustrations in the drawings we show them made with two modules 224 and means to connect these modules 224 to other modules 224 in strips 248. This is for purposes of illustration only. Strips 248 may be made with any given number of modules 224 or of indeterminate length.

Strips of modules 248 may be also joined. Strips can be joined by connecting means 274 to connect the bearing means 244 at a material surface or by providing a connecting means 276 at the level of levers C of strips 248.

Connecting means 276 would comprise a coupling formation have post means 278 and post receiver means 280 at one end of the strip 248. The other end of strip 248 is also provided with a post 282 and a post receiver 284. When ends of module strips 248 are to be connected together, the post 278 will fit into post receiver 284 and post 282 will fit into post receiver 280.

It can be readily understood that by the use of a plurality of strips 248 of the invention connected by their coupling means 250 in transverse back to back fashion with one or more rows parallel against one or more transverse ranks, a sheet of cushioning material having a double surface of displaceable means or pads will be constructed. Where it is desired to use the strip or sheet construction of this invention for a one surface displaceable bearing pad area such as the top of a seating area or in a shoe sole or in other construction where only one displaceable surface is needed, the connections between the modules at the surface area and the structure to which it is to be attached are made in the same manner except that instead of having back to back facing modules 224, the C lever may be connected to footings 290 to be placed against the structure or thing with which the cushioning strips 248 is to be used.

The footings 290 may be in lever form against the structure. Branch ends 292 may slope away from the structure so that when the ends 292 are flexed by a load placed on the lever, footings 290 will spread the ends 292 against the surface 294 providing a greater area of contact between the lever ends and the surface. This will result in a stiffening of the material of the lever.

In a double surface **244*a*, 244*b*, material 222 the upper and lower strips 248 will form rows in which the bearing means 242 may be laterally offset between upper and lower edges, as seen in FIG. 25. An edge filler means 294 of foam or other suitable material may be used to finish the edges all around. A mattress or other cushioning article may be formed in this way and finished with a suitable cover 296**.

Other variations of the cushioning material include a type of bearing plate 300 as shown in FIG. 17. Bearing plate 300 is provided with notch means 302 and perforations 304 which aid in flexing where desired. For example, in a dress shoe footwear construction.

Another double surface material may be made by placing 2 sheets of material 150 back to back in 90 degree rotation and fastening points 162 together to form a double thick sheet having plates 158 at both surfaces. All points 162 are equidistant and may be fastened by heat sealing or cement, or any other means.

While the invention has been described in its preferred forms there are other forms which it may take without departure from the spirit and scope of the invention and it is desired to be covered for all forms coming within the claims hereinbelow.

Wherefore, I claim:

1. A cushioning material construction comprising a mechanical support system comprising at least one module comprising a plurality of displaceable bearing means, particular ones of said bearing means being interconnected to others of said bearing means by a first lever-type arrangement, so as to define a grouping of bearing means, said first lever-type arrangement being operative upon displacement of one of said load support means in a first direction to apply a force to another of said bearing means in an opposite direction, such that the displaceable bearing means will displace to conform to the shape of an imposed load and provide for distribution of load supporting forces; wherein selected groupings of interconnected bearing means are further interconnected to other groupings of interconnected bearing means by means comprising a second lever-type arrangement in combination with main support means comprising an article of wearing apparel.

2. An article of wearing apparel in which there is at least one pair of cushioning material constructions as claimed in claim 1.

3. The cushioning material construction as claimed in claim 1 in which the article of wearing apparel is footwear.

4. An article of footwear in which there is at least one pair of cushioning material construction as claimed in claim 3.

5. The footwear as claimed in claim 3, in which the main support means is in the form of an elongated member comprising a toe cross member and arch cross member and a heel cross member, with said arch cross member being rotatably associated with said elongated frame member and all of said cross members comprising modules, at least at their outer ends.

6. The footwear as claimed in claim 5, in which the bearing means of the modules are attached to a sole member of the footwear.

7. The footwear as claimed in claim 6, in which the main support means is attached to an outer sole of the footwear.

8. The footwear as claimed in claim 7, in which the elongated member has a normally flat lower surface and the arch cross member has a lower surface which slopes upwardly on either side of the elongated member.

9. The footwear as claimed in claim 8, in which the elongated member is made of a deformable resilient material.

10. The footwear as claimed in claim 8, in which the elongated member is integral and made of a springy material.

11. The footwear as claimed in claim 5, in which the support means is made of a springy material with at least one of said cross members having a pair of arms which extend laterally and upwardly from the elongated frame member.

12. A cushioning material construction comprising a mechanical support system having a plurality of repeating module units; said module units each including a plurality of displaceable bearing means, particular ones of said bearing means being interconnected to others of said bearing means by a torsionally and flexurally resilient first lever-type arrangement so as to define a grouping of bearing means, said first lever-type arrangement being operative upon displacement of one of said bearing means in a first direction to apply a force to another of said bearing means in an opposite direction, such that the displaceable bearing means will displace to conform to the shape of an imposed load and provide for resiliently constrained distribution of load supporting forces, selected groupings of interconnected bearing means being further interconnected to other groupings of interconnected bearing means by additional torsionally and flexurally resilient lever-type arrangements; wherein a plurality of module units are joined together at like portions of at least one of the like lever-type arrangements to thereby form a matrix of repeating module units.

13. The cushioning material construction as claimed in claim 12, in which the modules are made of a springy material.

14. The cushioning material construction as claimed in claim 13, positioned to be wrapped around a limb.

15. The cushioning material construction as claimed in claim 14 further comprising a cast.

16. The cushioning material construction as claimed in claim 15, in which the cast is a plaster cast.

17. The cushioning material construction as claimed in claim 13, in which the modules are connected together at the ends of the second lever-type arrangement.

18. The cushioning material construction as claimed in claim 17, in which the modules are arranged in rows in staggered relationship.

19. The cushioning material construction as claimed in claim 18, in which selected groupings of interconnected bearing means are further connected to other groups of interconnected means by means comprising a third lever-type arrangement.

20. The cushioning material construction as claimed in claim 19, in which the third lever-type arrangement comprises levers having centrally located rocker means.

21. The cushioning material construction as claimed in claim 19, in which the modules are further interconnected by bearing means in the form of displaceable bearing plates which are connected to the first lever-type arrangement of a plurality of modules.

22. The cushioning material construction as claimed in claim 21, in which the said bearing plates are interconnected at least to one of the lever-type arrangements of four of the modules.

23. The cushioning material construction as claimed in claim 19, in which at least one module comprises at least one footing extending laterally from at least one lever of the third lever-type arrangement.

24. The cushioning material construction, as claimed in claim 23, in which there are at least one pair of footings extending laterally from opposite sides of said lever of the third lever-type arrangement.

25. The cushioning material construction, as claimed in claim 21, in which the said bearing plates are provided with at least one notched means.

26. The cushioning material construction as claimed in claim 24, in which the said bearing plates are provided with at least one perforation means.

27. A footwear construction as claimed in claim 13, comprising at least one cushioning material construction.

28. A footwear construction as claimed in claim 27, in which the cushioning material construction is positioned over an outer sole.

29. The footwear construction as claimed in claim 28, in which said outer sole has rows of grooves on its upper surface and at least a portion of a lever of a module of said cushioning material construction is positioned in said groove.

30. A footwear construction as claimed in claim 28, which comprises an outer shell having an outer sole and an inner shell having a sole portion in which the cushioning material construction is positioned between the mentioned shells.

31. A footwear construction as claimed in claim 28, which comprises an outer shell having an outer sole and an inner shell having a sole portion in which the cushioning material construction is positioned over the sole of the inner shell which in turn is positioned over the sole of the outer shell.

32. A footwear construction as claimed in claim 27, which comprises a sole and uppers; said footwear construction comprising at least one of said cushioning material construction.

33. A footwear construction as claimed in claim 32, in which the cushioning material construction is covered.

34. A footwear construction as claimed in claim 32, which comprises a tongue portion in which a cushioning material construction is positioned.

35. The cushioning material construction as claimed in claim 12, formed in at least one continuous module strip.

36. The cushioning material construction as claimed in claim 35, in which the module strip comprises at least one module and means to connect said module to another module strip; said means comprising coupling means comprised in a third lever-type arrangement.

37. The module strip as claimed in claim 36, which comprises at least one module connected to at least a portion of a lever in a third lever-type arrangement adapted to be connected to other similar modules or in the connection as made along said third lever-type arrangement which forms the strip to support said module.

38. The module strip as claimed in claim 37, comprising a plurality of modules connected through the ends of said lever-type arrangements.

39. The module strip as claimed in claim 38, made of springy material in which at least one of the levers comprising the third lever-type arrangement comprises coupling means for coupling said module strip in back to back arrangement with another module strip.

40. The module strip as claimed in claim 39, in which the coupling means comprises a coupling portion comprising a notched portion and a solid portion wherein the notched portion is adapted to fit over the solid portion of another strip in making the coupling.

41. The module strip as claimed in claim 40, in which the notched and solid portions of said coupling portion comprises at least one shoulder.

42. The module strip as claimed in claim 41, in which the said shoulder comprises at least one stepped portion.

43. A cushioning material construction comprising a plurality of module strips as claimed in claim 13, in which the said strips are connected at a central portion of at least one lever of the third lever arrangement in a back to back arrangement to form at least one module strip upper row and at least one module strip lower row; said rows being substantially perpendicular to each other.

44. A module strip as claimed in claim 13, in which the third lever-type arrangement forms an elongated strip having a first connection means at one end of a lever and a second connection means at another end of a lever.

45. The module strip as claimed in claim 44, in which the connecting means comprises at least one post and at least one post receiver.

46. The module strip as claimed in claim 44, which comprises at least one tubular portion adjacent at least one end of a third lever-type arrangement lever.

47. The cushioning material construction as claimed in claim 43, which comprises a plurality of upper and lower rows of module strips.

48. The cushioning material construction as claimed in claim 47, in which the rows of module strips are connected by at least one connecting means at the ends of a third lever-type arrangement lever and at least one coupling means at the center of a third type arrangement lever.

49. A cushioning material construction as claimed in claim 47 further comprising at least one edge to finish the material at an edge formed by offset upper and lower module strip bearing means.

50. A cushioning material construction as claimed in claim 49, further comprising at least one cover.

51. A cushioning material construction as claimed in claim 50, comprised in a mattress.

52. A cushioning material construction as claimed in claim 13 comprised in a shock absorbing material.

53. A cushioning material construction as claimed in claim 13, comprised in a vehicle.

54. A cushioning material construction as claimed in claim 13, comprised in a stationary structure.

55. A cushioning material construction as claimed in claim 13, comprised in a moving structure.

56. A cushioning matrix comprising a skeletal structure having a plurality of members defining a surface to which a body can be applied, struts interconnected with one another and with said members for developing a plurality of three dimensional pyramidal groups in which, in a direction inwardly from each said member, the strut connected to said member has a point intermediate its ends which point is connected to the end of another strut which, in turn, has a point intermediate its ends which point is connected to the end of yet another strut until the apex of each of said pyramidal groups is reached, said struts being formed from strong polymeric material susceptible of twisting and bending to a limited extent under normal load with the struts being dimensioned and the material selected such that displacement of any one member under said load is accompanied in part by a reaction against the other members and in part by an elastic deformation of said skeletal structure, and means at the apex of each said group for interconnecting said group in back-to-back relationship to another of said groups.

57. A cushioning matrix according to claim 56, wherein said means at the apex of each said group comprises a notch for orthogonally and matingly engaging another of said notches.

58. A cushioning matrix according to claim 57, wherein said pyramidal groups are constructed and arranged for end-to-end coupling to form an elongated chain of said groups.

59. A cushioning matrix according to claim 56, wherein said pyramidal groups are constructed and arranged for end-to-end coupling to form an elongated chain of said groups.

60. A cushioning matrix comprising a skeletal structure having a plurality of members defining a surface to which a body can be applied, struts interconnected with one another and with said members for developing a plurality of three dimensional pyramidal groups in which, in a direction inwardly from each said member, the strut connected to said member has a point intermediate its ends which point is connected to the end of another strut which, in turn, has a point intermediate its ends which point is connected to the end of yet another strut until the apex of each of said pyramidal groups is reached, said struts being formed from strong polymeric material susceptible of twisting and bending to a limited extent under normal load with the struts being dimensioned and the material selected such that displacement of any one member under said load is accompanied in part by a reaction against the other members and in part by an elastic deformation of said skeletal structure, the apex of each said group being joined in back-to-back relationship to another of said groups.

61. A cushioning matrix according to claim 60, wherein back-to-back pyramidal groups are coupled end-to-end to form an elongated chain of said groups.

62. A cushioning matrix comprising a skeletal structure having a plurality of members defining a surface to which a body can be applied, struts interconnected with one another and with said members for developing a plurality of three dimensional pyramidal groups in which said members are each connected to a particular strut at an end thereof, and a point intermediate the ends of each of said particular struts is connected to the apex of each of said pyramidal groups by the interconnection of struts with the intermediate point of one strut connected to the end of the next strut seriatum to the apex, said struts being formed from strong polymeric material susceptible of twisting and bending to a limited extent under normal load with the struts being dimensioned and the material selected such that displacement of any one member under said load is accompanied in part by a reaction against the other members and in part by an elastic deformation of said skeletal structure, and means at the apex of each said group for interconnecting said group in back-to-back relationship to another of said groups.

63. A cushioning matrix according to claim 62, wherein adjacent interconnected struts are related orthogonally.

64. A cushioning matrix comprising a skeletal structure having a plurality of members defining a surface to which a body can be applied, struts interconnected with one another and with said members for developing a plurality of three dimensional pyramidal groups in which said members are each connected to a particular strut at an end thereof, and a point intermediate the ends of each of said particular struts is connected to the apex of each of said pyramidal groups by the interconnection of struts with the intermediate point of one strut connected to the end of the next strut seriatum to the apex, said struts being formed from strong polymeric material susceptible of twisting and bending to a limited extent under normal load with the struts being dimensioned and the materials selected such that displacement of any one member under said load is accompanied in part by a reaction against the other members and in part by an elastic deformation of said skeletal structure, and mechanical interlocking means for interconnecting said groups in side-by-side relationship to extend said surface to any desired dimensions.

65. A cushioning matrix according to claim 64, wherein a plurality of said groups are integrally joined in side-by-side relationship to provide a module, and said mechanical interlocking means are provided on said modules to provide an extended field of repeating modules.

* * * * *